Figure 1:
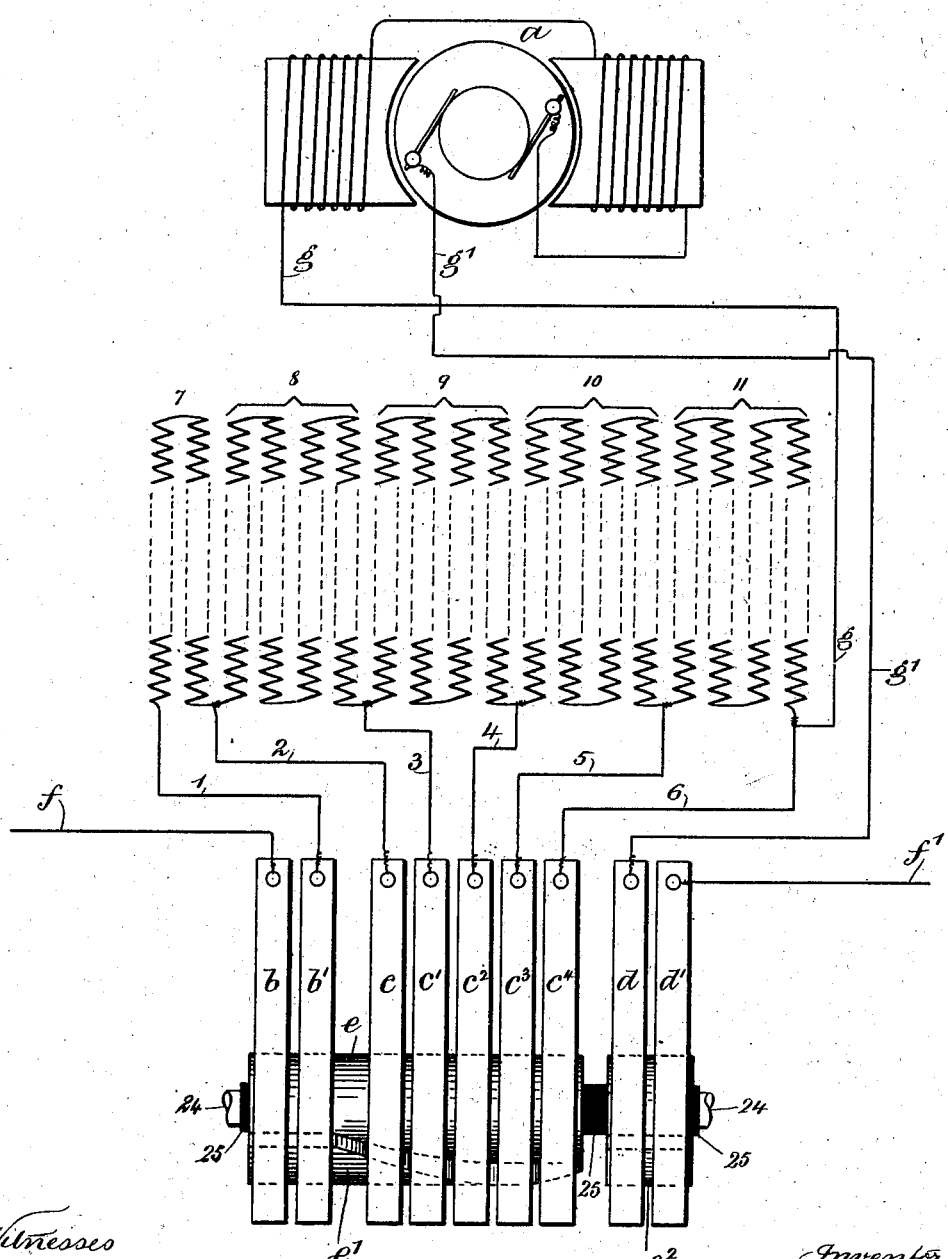

No. 728,537. PATENTED MAY 19, 1903.
O. C. BRITSCH.
DEVICE FOR ACTUATING AND CONTROLLING ELECTRIC MOTORS.
APPLICATION FILED NOV. 28, 1902.
NO MODEL. 4 SHEETS—SHEET 1.

Witnesses
Chas H Smith
J. Staib

Inventor
Otto C. Britsch.
per L. W. Serrell
atty

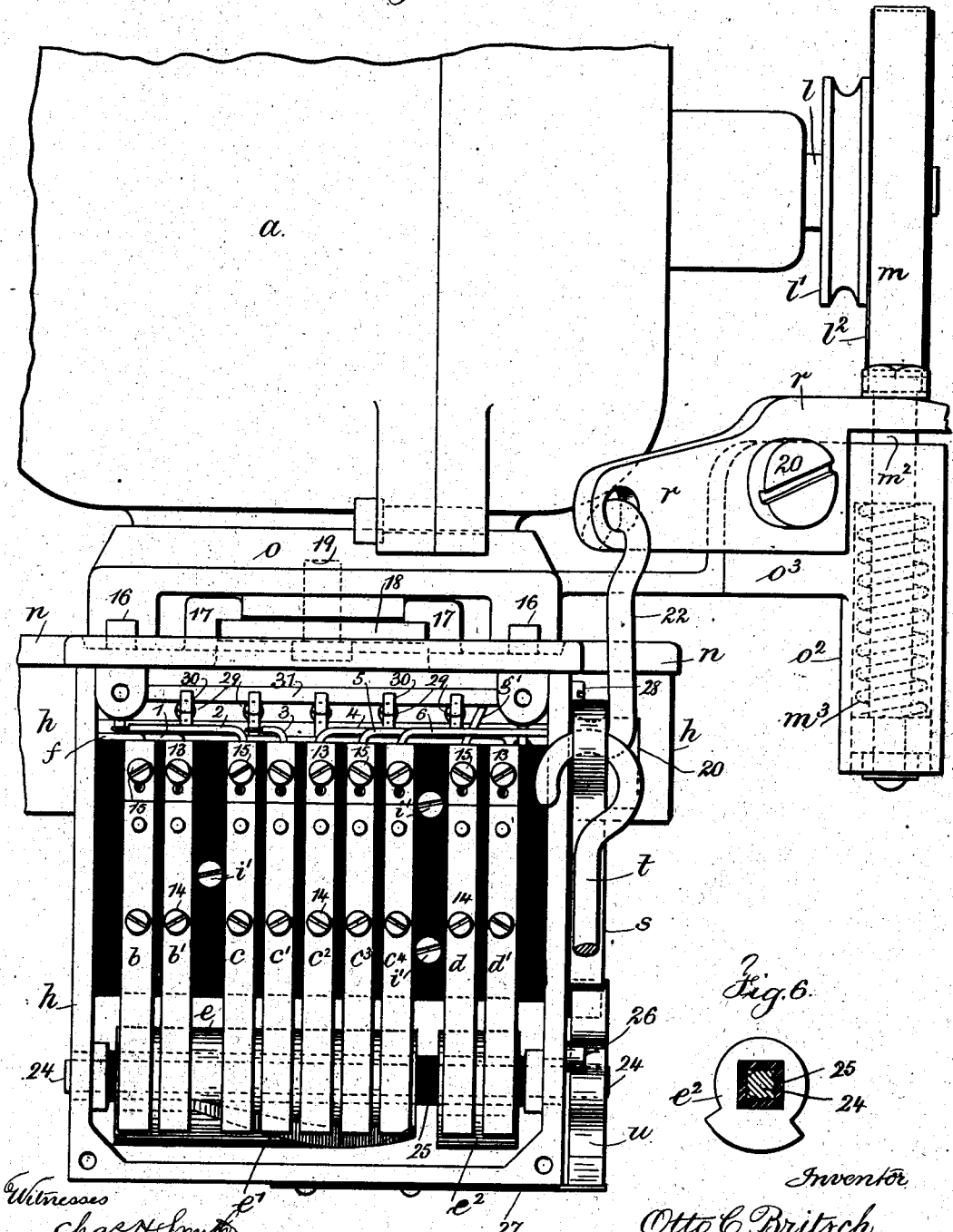

No. 728,537. PATENTED MAY 19, 1903.
O. C. BRITSCH.
DEVICE FOR ACTUATING AND CONTROLLING ELECTRIC MOTORS.
APPLICATION FILED NOV. 28, 1902.
NO MODEL. 4 SHEETS—SHEET 3.
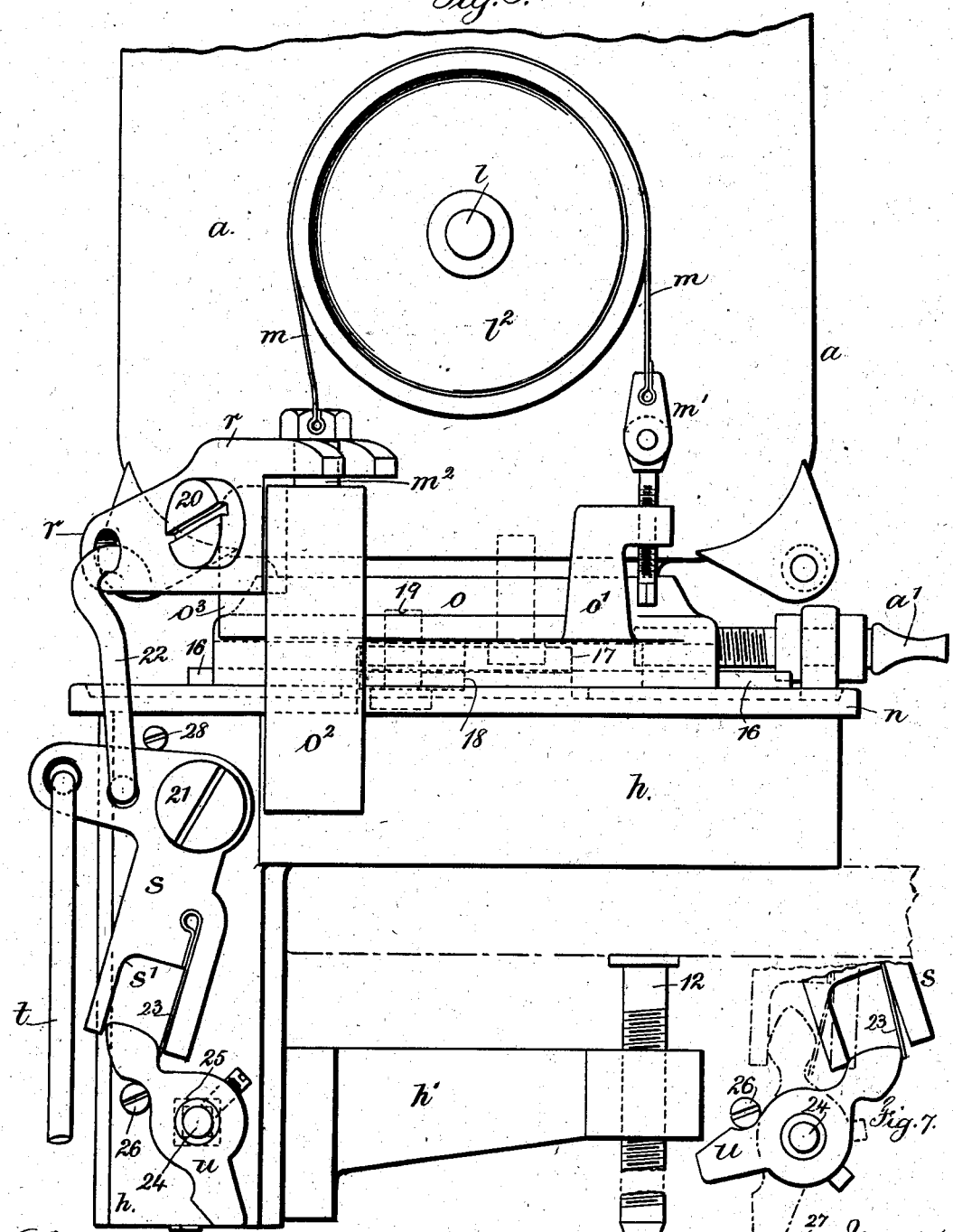

No. 728,537. PATENTED MAY 19, 1903.
O. C. BRITSCH.
DEVICE FOR ACTUATING AND CONTROLLING ELECTRIC MOTORS.
APPLICATION FILED NOV. 28, 1902.
NO MODEL. 4 SHEETS—SHEET 4.
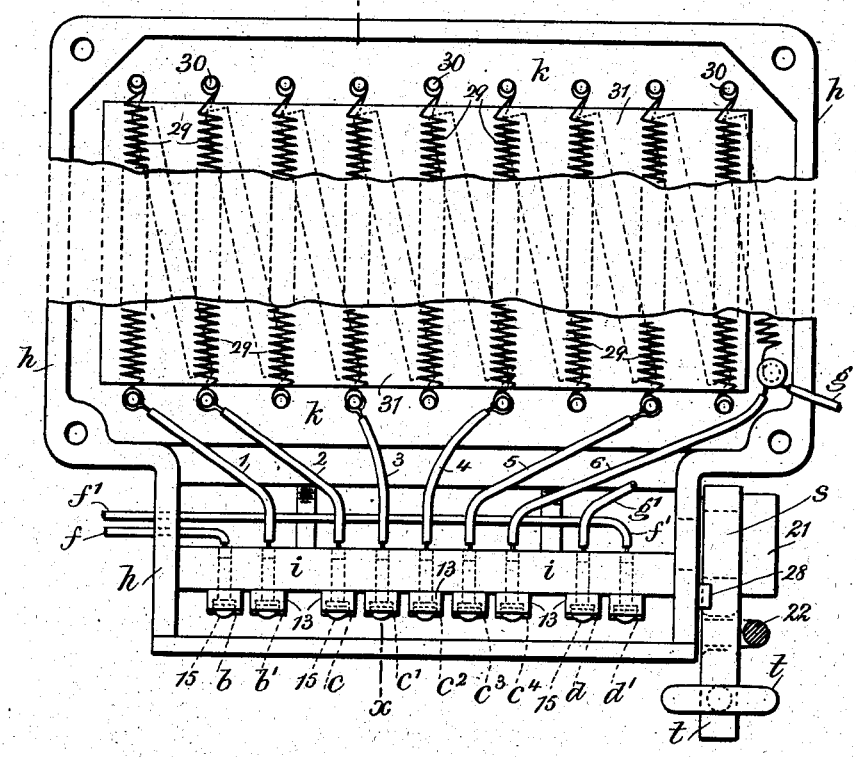
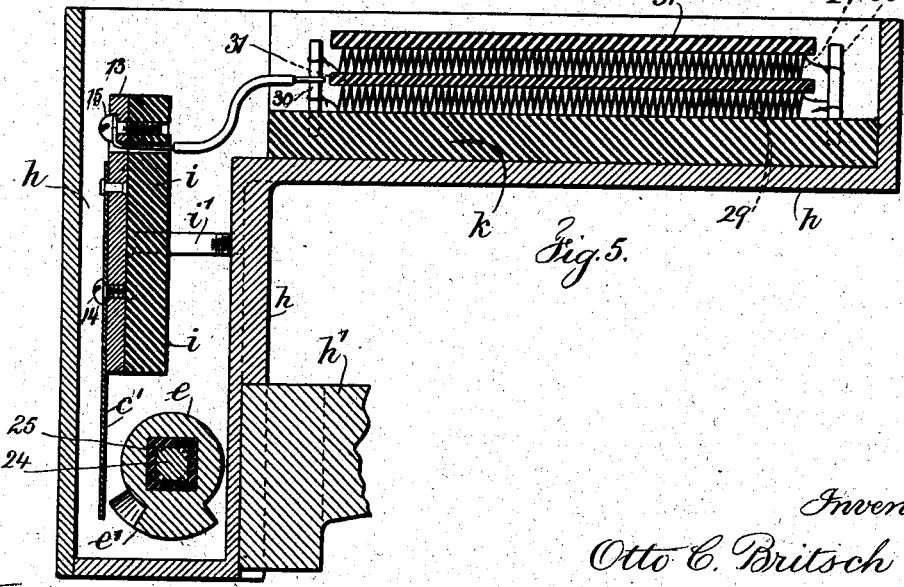
Inventor
Otto C. Britsch
Witnesses No. 728,537.

Patented May 19, 1903.

UNITED STATES PATENT OFFICE.

OTTO C. BRITSCH, OF MASPETH, NEW YORK, ASSIGNOR TO DAVID WALD, OF NEW YORK, N. Y.

DEVICE FOR ACTUATING AND CONTROLLING ELECTRIC MOTORS.

SPECIFICATION forming part of Letters Patent No. 728,537, dated May 19, 1903.

Application filed November 28, 1902. Serial No. 132,986. (No model.)

*To all whom it may concern:*

Be it known that I, OTTO C. BRITSCH, a citizen of the United States, residing at Maspeth, in the county of Kings and State of New York, have invented an Improvement in Devices for Actuating and Controlling Electric Motors, of which the following is a specification.

My invention relates to an electric device mechanically actuated for starting, stopping, and controlling the speed of electric motors, especially those employed for driving light machinery, such as sewing-machines.

In carrying out my invention the electrical device and juxtaposed motor are supported adjacent to the machine to be driven, and a treadle moved by power—namely, the foot of the operator—simultaneously releases the motor and establishes the electric circuit for running the motor. With the establishment of the electric circuit a series of resistances are brought in which reduce the power of the electric current supplied to the motor-terminals, so that the motor starts at a minimum speed only. This speed may afterward be progressively increased by a step-by-step cutting out of the resistances and consequent increase of the power of the electric current until all the resistances are cut out and the motor is running at full speed by the full strength of the current. This condition maintains so long as the foot-power applied by the operator to the treadle is constant and holds under tension a spring structure of sufficient strength to effect the return movement; but as soon as the foot-power is released this spring structure comes into play to apply a brake to stop the motor and to simultaneously break the electric circuit through the electrical device.

In the drawings, Figure 1 is a diagrammatic view representing a motor, detached parts of the device of my invention, and resistances in series. Fig. 2 is a front elevation of the major part of a complete structure. Fig. 3 is a side elevation of the same. Fig. 4 is a plan with the motor-base and cover of the frame and underlying parts removed for clearness. Fig. 5 is a vertical cross-section at $x\ x$ of Fig. 4. Fig. 6 is an end elevation of the ribbed hub and a section of its shaft and insulating-sleeve, and Fig. 7 is an elevation of the cam on the end of said shaft in two of its positions with part of the lever operating the same.

The motor device or structure $a$ may be of any desired or well-known character, the same forming no part of my present invention. This motor structure is shown as having a shaft $l$, a pulley $l'$ for a band extending therefrom to the sewing-machine or other mechanism to be driven, and a brake-wheel $l^2$. In the diagrammatic view, Fig. 1, the motor structure $a$ is illustrated as of conventional form. In this figure, $b\ b'$, $c\ c'\ c^2\ c^3\ c^4$, and $d\ d'$ are circuit-selectors in the form of spring-blades. $f\ f'$ are line-wires connected, respectively, to the circuit-selectors $b$ and $d'$, the wire $f$ extending to the circuit-selector $b$ and the wire $f'$ from the circuit-selector $d'$. $e$ is a contact-cylinder having a long tapering rib $e'$, and $e^2$ is a ribbed hub on the same shaft, the radius of which parts is appreciably greater than that of the major portion of the cylinder. $g\ g'$ are wires for the electric current from the motor. 1, 2, 3, 4, 5, and 6 are wires from the circuit-selectors to the resistances 7, 8, 9, 10, and 11, which are shown in this diagrammatic view as in groups. The wire $g$ from the motor connects to the wire 6 adjacent to the terminus of the resistance 11, and the wire $g'$ from the motor passes to the circuit-selector $d$. The contact-cylinder $e$ and the ribbed hub $e^2$, as hereinafter described, are given a partial rotation by a suitable device, so as to bring the rib $e'$ and the rib of the hub $e^2$ into contact with the free ends of the circuit-selectors $b\ b'$ and $d\ d'$, making therewith electrical contact and providing a path for the current from the wire $f$ through $b\ e'\ b'$, the wire 1 through the series of resistances 7, 8, 9, 10, and 11 by the wire $g$ to the motor, through the motor and by the wire $g'$ to the circuit-selector $d$, the ribbed hub $e^2$, the circuit-selector $d'$, and away by the wire $f'$, in this manner starting the motor at a minimum speed only, all of the resistances being in evidence to reduce the speed and retard the current. If this contact-cylinder $e$, with its rib $e'$ and ribbed hub $e^2$, is turned a slightly greater distance, then the tapering rib $e'$ is brought into contact both mechanically and electrically with the circuit-selector $c$, or progressively with $c'$, $c^2$, $c^3$, and $c^4$, the circuit-selectors $b\ b'$ and $d\ d'$ remaining constant in electrical contact with the ribbed portion of said contact-cylinder and hub. When the circuit-selector $c$ is brought into contact with the rib $e'$, the electric current taking the shortest route passes from the wire $f$ through the circuit-selector $b$ to the circuit-selector $c$, by the wire 2 through the resistances 8, 9, 10, and 11, and by the wire $g$ to the motor. When contact is made between the rib $e'$ and the circuit-selector $c'$, the resistances 7 and 8 are cut out, and so when the circuit-selector $c^2$ is brought into contact progressively with the rib $e'$ the resistances 7, 8, and 9 are cut out. When the circuit-selector $c^3$ comes in contact in the progressive movement with the rib $e'$, the resistances 7, 8, 9, and 10 are cut out, and, finally, when the circuit-selector $c^4$ is in the progressive movement brought in contact with the rib $e'$ all of the resistances are cut out and the current flows from the wire $f$ through the circuit-selector $b$, the rib $e'$ of the contact-cylinder, by the circuit-selector $c^4$, wire 6, wire $g$ to the motor, through the motor by $g'$ to the circuit-selector $d$, by the ribbed hub $e^2$ to the circuit-cylinder $d'$, and away by the wire $f'$. With this progressive movement and the cutting out of the several resistances the power of the current is gradually increased and the speed of the motor progressively increased thereby until, finally, when all of the resistances are cut out, the current is flowing at its full power and the motor running at its full speed. Reverse movement imparted to the contact-cylinder $e$, its rib $e'$, and the ribbed hub $e^2$ gradually throws in these resistances into the circuit to assist in slowing down the motor, and the circuit is broken the moment the juxtaposed edges of the tapering rib $e'$ and the ribbed hub $e^2$ come away from the circuit-selectors $b\ b'$ and $d\ d'$ to completely shut off the current.

The structure in which the operations hereinbefore described are electrically and mechanically performed comprise the following: A plate-base $o$ is secured to the base of the motor structure in any desired manner, and this base is provided with an integral post $o'$, a bracket $o^3$, and a cylinder $o^2$ at the end of the bracket, there being a rising portion of said bracket formed therewith and with said cylinder, and which part serves as a point of attachment for parts hereinafter described. The frame $h$, of L shape, is provided with a bracket $h'$ and a clamping-screw 12 through the end of the bracket, by which said frame is removably secured to the top of a bench or table. (Shown in Fig. 3 by dotted lines.) This frame $h$ is provided with a cover $n$, having ribs 16 and lugs 17, and at one end said cover is provided with a lug through which passes the adjusting-screw $a'$. This screw passes into a portion of the base $o$ and is adapted in its rotation to draw said base along upon the cover $n$, the ribs 16 thereof forming guideways for the plate $o$, so as to adjust the position thereof with reference to the brake device hereinafter described and the band extending to the machine being driven. A plate 18 fits within the lugs 17 and is held to the base $o$ by a bolt 19, said plate and bolt moving with the base $o$, the plate being beneath the edges of the lugs 17, said plate and lugs serving to firmly hold down the base $o$ and the motor structure $a$ to the cover $n$, which cover in turn is secured to the frame $h$, preferably by corner-screws passing down through apertures in said cover into perforations in the corners of said frame. (Shown in Fig. 4.) Slabs of rigid insulating material $i$ and $k$ are within the frame $h$, the slab $k$ occupying a horizontal position in the upper portion of said frame and the slab $i$ occupying a vertical position in the forward part of said frame and secured thereto by the screws $i'$. Metal plates 13, occupying a vertical position, come directly behind the circuit-selectors $b\ b'$, $c\ c'$ $c^2\ c^3\ c^4$, and $d\ d'$, and screws 14 pass through the circuit-selectors and through said metal plates into the slab $i$, so as to hold said parts in position, and I may, as shown in Figs. 2 and 5, hold said circuit-selectors and metal plates together by rivets. I also employ screws 15, agreeing in number with the circuit-selectors and plates 13 and which pass through the upper portions of said metal plates 13 into the slab $i$ and serve the twofold purpose of securing said plates to said slabs and holding the ends of the wires $f$, 1, 2, 3, 4, 5, 6, $g'$, and $f'$ in position to said metal plates 13, the said wires by preference being located at the back of the slab $i$ and having their ends passing through apertures in the slab to mechanical and electrical contact with the screws 15. Fastening devices, not necessarily the screws 14 and 15, are to be employed. A band $m$, preferably of spring metal, extends over the brake-wheel $l^2$. At one end of this band there is an adjustable yoke device $m'$, connecting with the post $o'$ of the base $o$, and the other end of this band is connected to a stem $m^2$, which passes down through the cylinder $o^2$, there being a head at the upper end of said stem for the connection thereto of the band $m$, and nuts at the lower end of said stem, with a helical spring $m^3$ within the cylinder $o^2$ between the nuts on the lower end and the head of the cylinder through which the stem $m^2$ passes, the tendency of said spring being to draw the band $m$ against the surface of the brake-wheel $l^2$ with sufficient force and consequent friction to arrest the movement of the motor structure. A lever $r$, pivoted at 20 to the upright portion of the bracket $o^3$, is at one end forked to straddle the stem $m^2$ and at the other end provided with an aperture receiving the hooked end of a link 22. A bell-crank lever $s$ is pivoted at 21 to the side of the frame $h$. One arm of this lever is provided, adjacent to its pivot, with an aperture for the other end of the link 22 and at its free end with an aperture for the rod $t$. The other arm of the bell-crank lever is provided with a jaw $s'$. The contacting cylinder $e$, hereinbefore described, is mounted between the sides of the frame $h$ in the lower front portion, the shaft 24 thereof passing through the sides of the frame, and on one end of this shaft I provide a cam $u$. (Shown especially in Figs. 3 and 7.) Between the shaft 24 and the contact-cylinder $e$ and ribbed hub $e^2$ and between the sides of the frame $h$ is placed an insulating-sleeve 25, which prevents the electric current passing between the said contact-cylinder and ribbed hub or from either of said parts to the shaft 24 or therefrom to other parts of the mechanism. There is a stop 26 on the side of the frame $h$ adjacent to the cam $u$, a spring 27 connected to the lower part of the frame $h$ and projecting slightly beyond the end adjacent to said cam $u$ and coming in the path of said cam, and there is a stop 28 also upon the side of the frame $h$ for limiting the upward movement of the bell-crank lever $s$. Figs. 2 and 3 represent the normal position of rest of said parts, in which the spring $m^3$ draws upon the band $m$ to produce a frictional hold on the brake-wheel $l^2$, said stop 28 holding the lever $r$ from being drawn in contact with the upper end of the cylinder $o^2$, and in this position the cam $u$, as shown, agrees with the position of the contact-cylinder $e$ and ribbed hub $e^2$ in Fig. 5, where the same is not as yet in mechanical or electrical contact with any of the circuit-selectors, said cam being held in a position of rest against the stop 26. The operator may now press upon the treadle and pull upon the rod $t$. This movement swings the bell-crank lever $s$ and by the link 22 swings the lever $r$ on its pivot, strains the helical spring $m^3$, and releases the tension upon the band $m$, so that the motor is free to start. Simultaneously with this movement the jaw $s'$ of the bell-crank lever swings the cam $u$ in proportion to the extent of movement of said parts, the first portion of the movement bringing the contact-cylinder $e$ and the ribbed hub $e^2$ into engagement with the circuit-selectors $b\ b'$ and $d\ d'$ and thereafter progressively with the circuit-selectors $c, c', c^2, c^3$, or $c^4$, so as to apply a minimum current to the motor or progressively by cutting out the resistances an increased strength of current up to a maximum, where the motor develops its full speed and power.

Fig. 7 shows the cam $u$ and the jaw $s'$ of the bell-crank lever in the opposite position to that shown in Fig. 3 and in the position of extreme movement of the contact-cylinder $e$ and ribbed hub $e^2$ at which all of the resistances have been cut out and the full strength of the current is flowing from the wire $f$ through the circuit-selector $b$, the rib $e'$ of the cylinder, circuit-selector $c^4$, the wire 6, wire $g$, the motor, the wire $g'$, the circuit-selector $d$, the hub $e^2$, the circuit-selector $d'$, and by the wire $f'$. The dotted position, Fig. 7, shows the return movement substantially at the line of electrical separation of the ribs of the cylinder $e$ and hub $e^2$ from the circuit-selectors. The spring 23 is of sufficient strength to turn the cam $u$ and shaft 24, with the parts connected therewith, from the full-line position, Fig. 7, to the dotted-line position, Fig. 7, where the other end of the cam is arrested momentarily by the spring 27. When this movement is arrested, the spring 23 is put under tension and moved until the same strikes one side of the jaw $s'$, at which no further yielding is possible. The jaw then with force and a quick movement, which the spring 23 accelerates, returns the cam $u$ from the dotted-line position, Fig. 7, to the full-line position, Fig. 3, thus instantly breaking the electrical circuit between the contact-cylinder and hub and the various circuit-selectors, thus rendering any arcing impossible.

From the foregoing description it will be apparent that this structure is moved in one direction positively by the power applied by the foot of the operator to a treadle and the rod $t$ and that the return movement is effected automatically and substantially instantaneously by the expansive action of the helical spring $m^3$, which at the same time applies the band $m$ to the brake-wheel $l^2$ to arrest the motor and break the electric circuit through the machine.

In the diagrammatic view, Fig. 1, and as hereinbefore described, 7, 8, 9, 10, and 11 represent the resistances in groups, the same being shown by zigzag lines. In the structure described I prefer that these resistances shall be in the form of helices 29, of wire, with their ends respectively connected to pins 30, set in the slab $k$, of insulating material, said helices being stretched between the said pins in superposed series, one series of which, according to Fig. 4, are parallel to each other and parallel to the sides of the frame $h$, and the other series of which are parallel to each other and at an angle to the parts of the frame, and these series are preferably separated by layers 31 of insulating material, such as sheets of asbestos.

I claim as my invention—

1. The combination with an electric motor, of devices normally applying tension to brake the same, means operated by foot-power to release said devices, devices actuated simultaneously by said means for completing an electric circuit through the motor and for progressively increasing the current therein, and means for momentarily retarding the return movement of the latter devices and insuring a quick motion at the end of said movement for breaking the electric circuit so as to prevent the possibility of arcing.

2. The combination with an electric motor, of a series of resistances in groups, a series of alined circuit-selectors in three predetermined groups, line-wires connected to the first and extending from the last of said circuit-selectors, circuit-wires connecting the respective groups of resistances and the motor with the remaining and intermediate circuit-selectors, a rotary device and a ribbed hub upon and insulated from a common shaft, means for progressively rotating said shaft and the devices carried thereby to bring the same into contact with the circuit-selectors in a predetermined and progressive manner, substantially as and for the purposes set forth.

3. The combination with an electric motor, of a series of resistances in groups, a series of alined circuit-selectors in three predetermined groups, line-wires connected to the first and extending from the last of said circuit-selectors, circuit-wires connecting the respective groups of resistances and the motor with the remaining and intermediate circuit-selectors, a rotary device in the form of a ribbed cylinder, and a ribbed hub upon and insulated from a common shaft, means for progressively rotating said shaft and the devices carried thereby to bring the same into contact with the first and last group of circuit-selectors and progressively with the circuit-selectors of the intermediate group, substantially as and for the purposes set forth.

4. In a device for actuating and controlling electric motors, the combination with a motor and a series of resistances in predetermined groups, of a series of three groups of circuit-selectors, two in the first and last groups and two or more in the intermediate group, a shaft, an insulating-sleeve around the same, a cylinder having a long tapering rib and a ribbed hub mounted upon the insulated sleeve of said shaft at a predetermined distance apart, and means for imparting a partial rotation to said shaft and the parts connected therewith in opposite directions to make contact simultaneously with the circuit-selectors of the first and third groups and progressively with the circuit-selectors of the intermediate group, substantially as set forth.

5. In a device for actuating and controlling electric motors, the combination with a base supporting the motor and a post and cylinder carried thereby and a brake-wheel upon the shaft of the motor, of a band extending over said brake-wheel, an adjustable yoke device at one end of the band connected to said post, a stem connected to the other end of the band and passing through the head of said cylinder, a helical spring within the cylinder around said stem and between the head of the cylinder and nuts upon the end of the stem normally exerting a pressure-applying tension to the band upon the brake-wheel, and devices actuated by foot-power for applying tension to said spring to release the band upon the brake-wheel, and for simultaneously establishing an electric circuit to the motor.

6. In a device for actuating and controlling electric motors, the combination with a base supporting the motor and a post and cylinder carried thereby and a brake-wheel upon the shaft of the motor, of a band extending over said brake-wheel, an adjustable yoke device at one end of the band connected to said post, a stem connected to the other end of the band and passing through the head of said cylinder, a helical spring within the cylinder around said stem and between the head of the cylinder, and nuts upon the end of the stem normally exerting a pressure-applying tension to the band upon the brake-wheel, a pivoted lever having a forked end straddling said stem, a bell-crank lever, a link connecting one arm of the bell-crank lever with the other end of said pivoted lever, a rod from the said arm of the bell-crank lever to a foot-operated device, a cam at one end engaged by the other arm of said bell-crank lever and to which a forward and backward swinging movement is imparted by said lever, and a device upon the shaft of said cam, and electrical devices engaged thereby for making and breaking the electric current to said motor simultaneously with the movement of said cam and bell-crank lever, substantially as set forth.

7. In a device for actuating and controlling electric motors, the combination with predetermined groups of circuit-selectors, of a shaft, a cam on one end of said shaft, a stop for limiting the cam in its opposite positions, an insulating-sleeve upon said shaft, a ribbed cylinder and ribbed hub spaced apart upon the insulating-sleeve of said shaft and coming beneath the free ends of the said groups of circuit-selectors, devices operated by foot-power for moving said cam in one direction gradually through its entire movement and for moving said cam in the opposite direction with a partial yielding movement, and a spring-stop for momentarily arresting the return movement of the cam so as to effect the sudden and complete break of the electric circuit.

8. In a device for actuating and controlling electric motors, the combination with predetermined groups of circuit-selectors, of a shaft, a cam on one end of said shaft, a stop for limiting the cam in its opposite positions, an insulating-sleeve upon said shaft, a ribbed cylinder, and ribbed hub spaced apart upon the insulating-sleeve of said shaft and coming beneath the free ends of the said groups of circuit-selectors, a bell-crank lever and other devices operated by foot-power, a jaw at one end of said bell-crank lever and a spring forming part of said jaw, said jaw engaging one end of said cam positively on one side and by said spring in part on the opposite side and a spring-stop for momentarily holding said cam in its return movement so as to effect the sudden and complete break of the electric circuit.

9. In a device for actuating and controlling electric motors, the combination with a frame of cast metal adapted to be secured to a bench or table and having horizontal and vertical parts, of a slab of insulating material in the horizontal part, a series of pins carried thereby, series of helices stretched between said pins and forming resistances in the electric circuit, a slab of insulating material arranged in the forward part of said frame, a series of metal plates secured to said slab, a series of circuit-selectors secured to said plate and slab, line-wires connected to the first and last of said circuit-selectors and circuit-wires extending from the intermediate circuit-selectors to the said resistances arranged in groups and to the motor, substantially as and for the purposes set forth.

10. In a device for actuating and controlling electric motors, the combination with a frame of cast metal adapted to be secured to a bench or table and having horizontal and vertical parts, of a slab of insulating material in the horizontal part, a series of pins carried thereby, series of helices stretched between said pins and forming resistances in the electric circuit, a slab of insulating material arranged in the forward part of said frame, a series of metal plates secured to said slab, a series of circuit-selectors secured to said plate and slab, line-wires connected to the first and last of said circuit-selectors and circuit-wires extending from the intermediate circuit-selectors to the said resistances arranged in groups and to the motor, and a revoluble device, to which forward and backward movements may be imparted, located adjacent to the free ends of said circuit-selectors and providing for simultaneous contact with part of said selectors and progressive contact with other of said circuit-selectors, substantially as set forth.

11. In a device for actuating and controlling electric motors, the combination with a frame of cast metal adapted to be secured to a bench or table and having horizontal and vertical parts, of a slab of insulating material in the horizontal part, a series of pins carried thereby, series of helices stretched between said pins and forming resistances in the electric circuit, sheets of insulating material between and over the said series of helices, a slab of insulating material arranged in the forward part of said frame, a series of metal plates secured to said slab, a series of circuit-selectors secured to said plate and slab, line-wires connected to the first and last of said circuit-selectors and circuit-wires extending from the intermediate circuit-selectors to the said resistances arranged in groups and to the motor, substantially as and for the purposes set forth.

Signed by me this 12th day of November, 1902.

OTTO C. BRITSCH.

Witnesses:
GEO. T. PINCKNEY,
S. T. HAVILAND.